US012640000B2

(12) United States Patent
Westphal et al.

(10) Patent No.: US 12,640,000 B2
(45) Date of Patent: May 26, 2026

(54) ROBOTIC VENDING MACHINE SYSTEM

(71) Applicant: W.W. Grainger, Inc., Lake Forest, IL (US)

(72) Inventors: Geoffry A. Westphal, Evanston, IL (US); Viraj Sagar Sahgal, Chicago, IL (US); Jean-Marc Francois Reynaud, Chicago, IL (US); Erwin Cruz, Lake Forest, IL (US); Thomas Allen Mathis, Tolono, IL (US); David Brenner, Round Lake, IL (US); Sampo Juhani Karvonen, Allen, TX (US); Mehrdad Zakershahrak, Libertyville, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 557 days.

(21) Appl. No.: 18/191,197

(22) Filed: Mar. 28, 2023

(65) Prior Publication Data

US 2023/0316848 A1      Oct. 5, 2023

Related U.S. Application Data

(60) Provisional application No. 63/325,042, filed on Mar. 29, 2022.

(51) Int. Cl.
| | |
|---|---|
| *G07F 11/24* | (2006.01) |
| *B25J 5/00* | (2006.01) |
| *B25J 9/16* | (2006.01) |
| *B25J 19/00* | (2006.01) |
| *G07F 9/00* | (2006.01) |

(52) U.S. Cl.
CPC ............... *G07F 11/24* (2013.01); *B25J 5/007* (2013.01); *B25J 9/1664* (2013.01); *B25J*

*9/1679* (2013.01); *B25J 19/005* (2013.01); *G07F 9/002* (2020.05); *G07F 9/006* (2013.01)

(58) Field of Classification Search
CPC ............. G05B 19/41895; G06Q 20/18; G06Q 10/083; G05D 1/667; G07F 11/24; G07F 9/002; G07F 9/006; G07F 11/005; G07F 11/36; G07F 11/72; B25J 5/007; B25J 9/1664; B25J 9/1679; B25J 19/005; B25J 11/008; B60P 3/007
See application file for complete search history.

(56) References Cited

U.S. PATENT DOCUMENTS

| | | | |
|---|---|---|---|
| 9,592,742 B1 | 3/2017 | Sosinov et al. | |
| 10,275,975 B2 | 4/2019 | High et al. | |
| 10,854,033 B2 * | 12/2020 | Jafa ......................... | G07F 11/02 |
| 11,004,297 B2 | 5/2021 | Morad et al. | |
| 11,220,190 B2 | 1/2022 | Schutz et al. | |
| 11,251,793 B2 | 2/2022 | Staev et al. | |

(Continued)

FOREIGN PATENT DOCUMENTS

| | | | | |
|---|---|---|---|---|
| CN | 110301825 A | * 10/2019 | ........... | G07F 13/065 |
| CN | 111571585 A | * 8/2020 | .............. | G07F 11/00 |

(Continued)

*Primary Examiner* — Timothy R Waggoner
(74) *Attorney, Agent, or Firm* — Barnes & Thornburg LLP

(57)      ABSTRACT

A vending system including a vending machine and a robot. The robot can be adapted to retrieve product from the vending machine for delivery to a user. When the vending machine is mobile, the robot can alternatively move the entirety of the vending machine to a product delivery location.

23 Claims, 2 Drawing Sheets

(56)         References Cited

U.S. PATENT DOCUMENTS

| 12,073,678 B2 * | 8/2024 | Sato | G07F 11/02 |
| 2016/0129592 A1 * | 5/2016 | Saboo | B25J 19/021 |
| | | | 700/248 |
| 2019/0206175 A1 | 7/2019 | High et al. | |

FOREIGN PATENT DOCUMENTS

| CN | 114571483 A * | 6/2022 | B25J 5/02 |
| CN | 116052326 A * | 5/2023 | G07F 9/026 |

* cited by examiner

ROBOTIC VENDING MACHINE SYSTEM

RELATED APPLICATION INFORMATION

This application claims the benefit of U.S. Provisional Application No. 63/325,042, filed on Mar. 29, 2022, which application is incorporated herein by reference in its entirety.

BACKGROUND

As seen in U.S. Pat. Nos. 11,251,793, 11,170,599, and 11,004,297, vending machines and the components thereof are generally known in the art.

As seen in U.S. Pat. Nos. 11,220,190, 10,275,975, US Publication No. 2019/0206175, and U.S. Pat. No. 9,592,742, robotic vending machines, robotic charge delivery systems, and the components thereof are generally known in the art.

Accordingly, to avoid having to repeat the information contained in these documents as concerns the robotic vending machine systems that are the subject of this disclosure, the disclosure within each of these documents is incorporated herein by reference in its entirety.

SUMMARY

A vending system including a vending machine and a robot. The robot can be adapted to retrieve product from the vending machine for delivery to a user. When the vending machine is mobile, the robot can alternatively move the entirety of the vending machine to a product delivery location.

DETAILED DESCRIPTION

Figure 1:
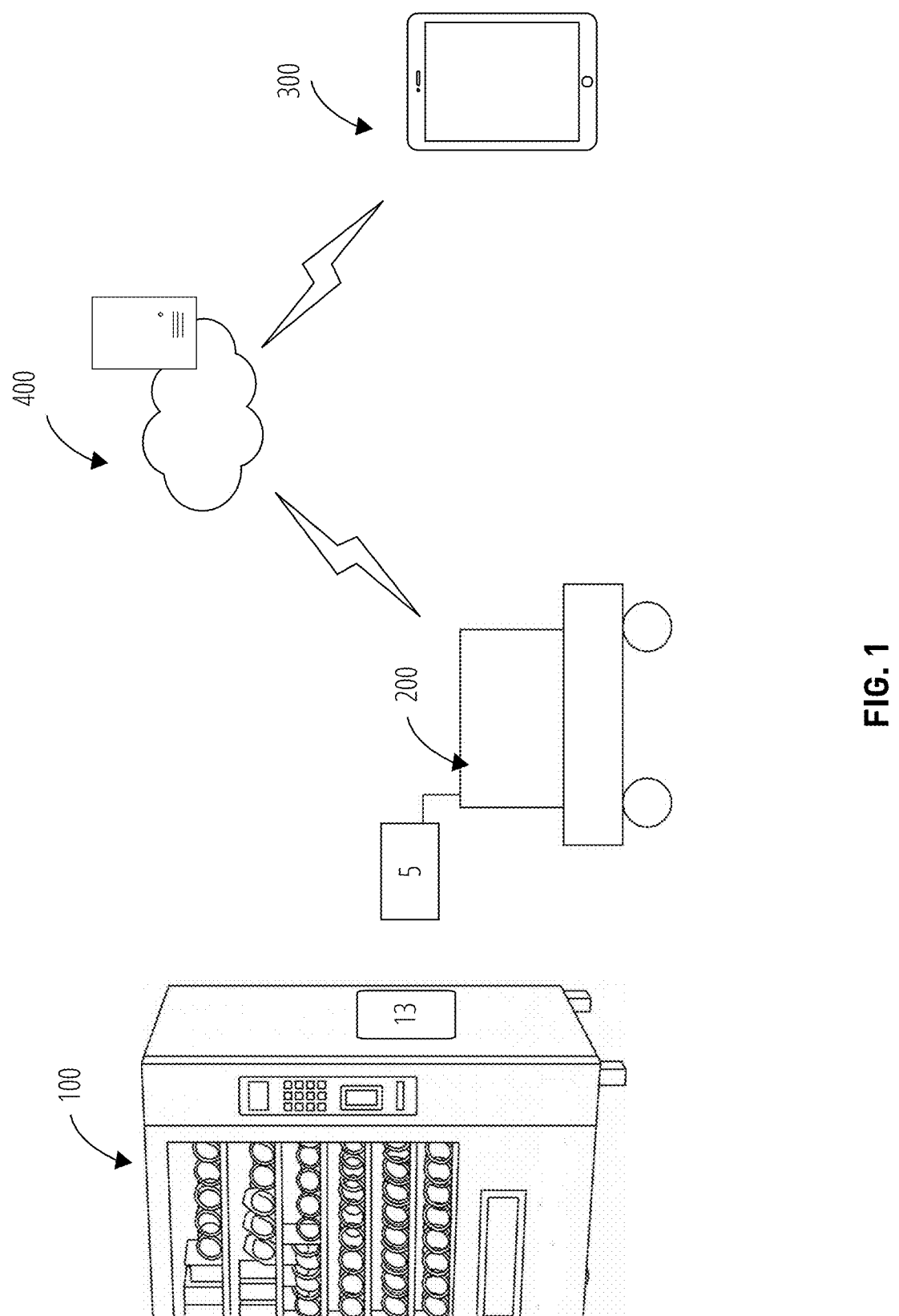
FIG. 1 illustrates an example robotic vending machine system including a vending machine and a robot adapted to couple to the vending machine, provide power to the vending machine, and retrieve product from the vending machine.
Figure 2:
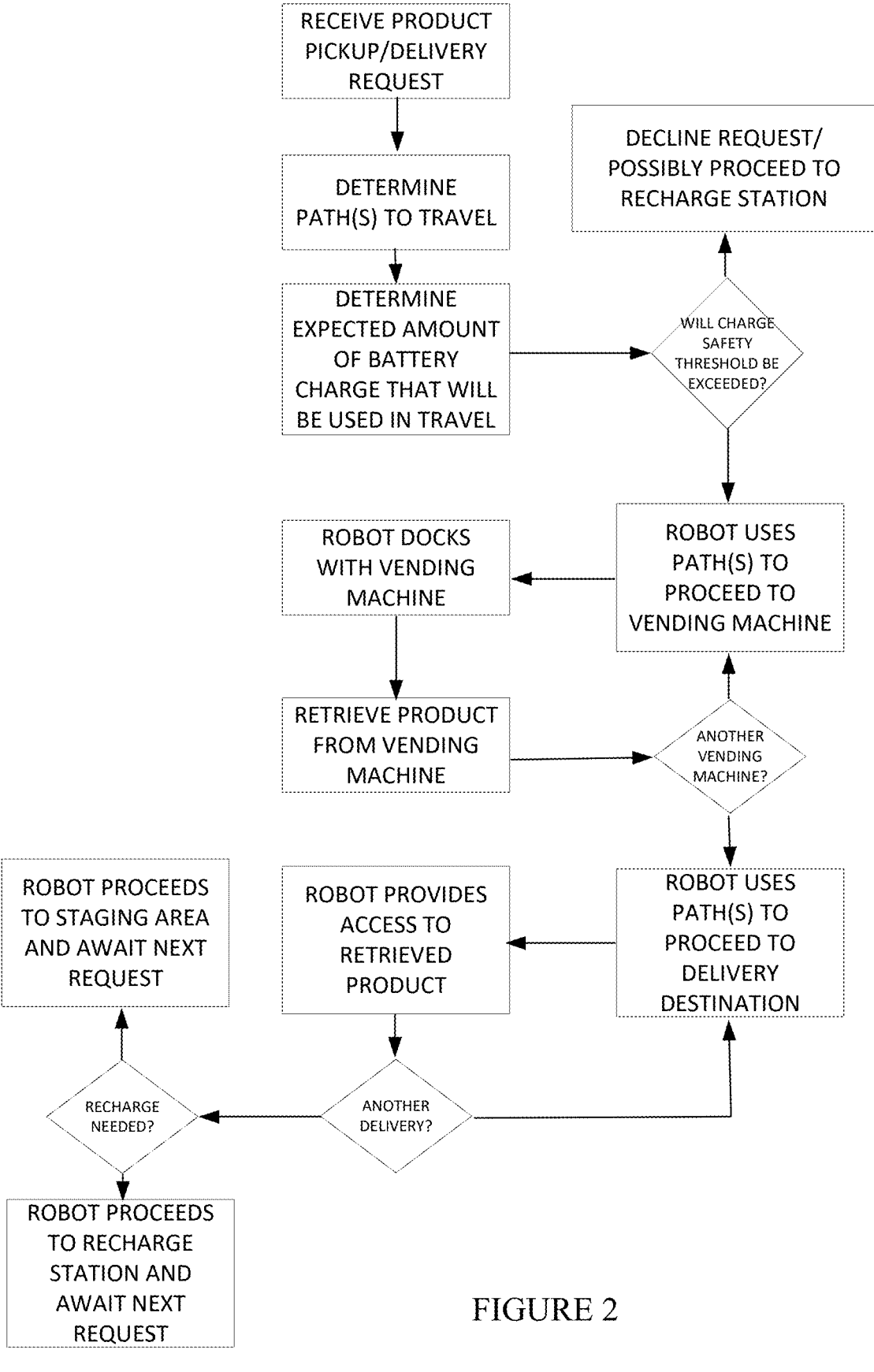
FIG. 2 illustrates example steps used to retrieve product from the vending machine and to delivery the retrieved product to a delivery location.

The following description of example robotic vending machine systems and their methods of use is not intended to limit the scope of the description to the precise form or forms detailed herein. Instead the following description is intended to be illustrative so that others may follow its teachings.

In an example, a robot 200 is provided to retrieve product from a vending machine 100 and to deliver the retrieved product to a user/delivery location. For this purpose, the robot 200 is adapted to navigate around a customer's facility, job site, etc. Preferably, the robot 200 is battery powered and the battery provides power to operate the various electronic systems (CPU, navigation sensors, etc.) and mechanical systems (wheels, steering, etc.) that are required for the robot 200 to fulfill its intended purposes. For example, in addition to the electronic and mechanical systems required to provide the robot 200 with the ability to navigate an environment and retrieve product from the vending machine 100, the robot 200 may include a bin for holding the product retrieved from a vending machine 100 and the electronic and mechanical systems may further include components for selectively securing the product within the bin, e.g., to provide an electronically lockable door to limit access to the bin.

In certain circumstances, upon docking with the vending machine 100, lights in the vending machine 100 could be caused to power on, the opacity of the viewing glass of the vending machine 100 could be changed or polarized from having a blocked view to allow viewing of the interior of the vending machine 100, etc. This selective illuminating of the vending machine 100 can be used to show that the vending machine 100 is in service (and to show what is available within the vending machine) and to prevent viewing into the vending machine when not use, e.g., to reduce theft. In case of a vending machine that will rove with a robot, e.g., following a maintenance worker, visibility into the vending machine 100 could change depending on what the worker is currently repairing, building or allowed to obtain.

As an autonomous device, it is preferred that the robot 200 additionally be provided with the ability to navigate to a charging station, e.g., an electrical outlet or electrical plug, an induction charging mat, or the like as appropriate for a given need. Navigation and robotic guidance can be accomplished using beacons, GPS coordinates, trackless guiding systems, accelerometer derived coordinates, visual recognition, and/or the like without limitation. In an example, the robot 200 can cause itself to return to a charging station upon the robot 200 determining that a remaining battery capacity is at or below a predetermined threshold. Similarly, the robot 200 can cause itself to return to a charging station upon the robot determining that it has executed a predetermined number of deliveries, traveled a predetermined distance, etc. Preferably, any recharging threshold is established such that the robot 200 can be used to complete a delivery run before the robot 200 needs to be returned to a charging station. At a minimum, any threshold should be sufficient so that the robot 200 can at least return from any given location within a service area to a nearest charging station.

In an example, when a product retrieval and delivery request is received by the system, the path(s) that will need to be traveled by one or more robots 200 may be determined, the expected amount of charge that will be required by each robot to travel the paths (and to power the vending machine(s), power any lockable storage bins, to power any robotic arms, etc. as required) may be determined and, based on the determinations, a robot 200 may be selected to fulfill the request. Per the above, the robot 200 that is selected will be a robot 200 that is determined to have a current battery charge in an amount such that, after the request is fulfilled, i.e., after the expected amount of charge to be used by that robot to complete the delivery and return to a charging station (if needed), the amount of charge remaining will equal or exceed the established safety threshold amount. The robot 200 selected can also be the robot that can fulfil the request most energy efficiently (i.e., the one that will use the least amount of battery charge to complete the task), most quickly (i.e., the one that will use the least amount of time to complete the task given the path(s) to be traveled and task(s) to be performed), or the like without limitation. If such a request is received directly by a robot 200 that has insufficient charge to fulfill the request as above, said robot 200 may be decline the request and/or suggest to the user that the request be provided to another robot 200.

In a further example system, one or more of the paths of travel of the robot 200 may also be provided with charge inducing lines in order to provide a charge to the robot 200 while the robot travels such paths. In this regard, the charge inducing lines can be embedded into the flooring of the warehouse, storeroom, etc. over which the robot 200 will travel. It will also be appreciated that the charge inducing lines may be utilized by the robot 200 as a means to provide a trackless system to guide the robot 200. In some further instances, the vending machine 100 can be used to recharge a robot 200 whilst the robot 200 is docked therewith.

To retrieve product from a vending machine 100, it is contemplated that the robot 200 will receive at least a data indicative of the delivery location(s) and a data indicative of the product pickup location(s). The data indicative of the product location can be data that identifies a specification of one or more product that is to be delivered to a user and/or a location of the product. When only the product to be retrieved from the vending machine 100 is specified, a look up can be used to determine the specific vending machine (and its location) the robot 200 needs to visit as needed. The product retrieval location(s) and the product delivery location(s) will be used to determine a path or paths of travel for the robot 200. For example, using the data indicative of the product to be retrieved, the system (e.g., the robot 200 and/or a cloud sever 400 in communication with the robot 200) can determine what one or more vending machine(s) 100 the robot 200 needs to visit to retrieve the product(s) specified. The vending machine information and the data indicative of the delivery location(s) may then be used to determine the path or paths of travel for the robot 200. In some circumstances, the robot 200 can itself determine the path or paths of travel. In other instances, a cloud server 400 or the like may determine, in whole or in part, the path or paths of travel and the server determined path or paths of travel may be provided to the robot 200. As noted above, when determining the path(s) of travel of a robot 200, the system may also determine an amount of battery charge that is expected to be used during the travel, the amount of time expected to be spent during the travel, etc.

The data indicative of the product retrieval location(s), e.g., data that indicates the product that is to be delivered to the user and/or the location of the product, may be provided to the robot 200 directly using input elements, such as a keypad, microphone, camera, etc., provided to the robot 200 or via use of a remote input device, such as via use of an app executing on a phone, tablet, or other smart device 300 where the app is associated with a cloud server 400 which, in turn, is communicatively coupled to the robot 200. To this end, the robot 200 may be provided with a cellular data transceiver, a local area network transceiver (e.g., WiFi transceiver), and/or the like without limitation that allows the robot 200 to communicate with external devices as needed. As will also be appreciated, the information provided to indicate the product pickup location(s) can be specified via use of a text message, a voice command, etc. The delivery location(s) can also be specified in the same manner. A delivery location can also be automatically selected using a positioning device associated with the input device 300 (e.g., using a GPS, WiFi beaconing, etc. positioning system) where the location determined by the positioning device at the time a product pickup and/or delivery request is made is provided as a default delivery location which may or may not be overridable by a user. A delivery location can also be adopted as a last delivery location for that product, a last delivery location for the user asking for a product, a predetermined/manager specified delivery location for the product and/or a combination thereof as desired.

The vending machines 100 from which the product is to be retrieved may or may not be self-powered, e.g., plugged into an electrical outlet. When the vending machine 100 is powered, the vending machine 100 can also be utilized as a recharging, docking station. In either case, the vending machine 100 is intended to provide a secure storage location for the product, i.e., absent proper authorization, whether provided by a user directly or via a robot 200 (for example by the robot providing power to the unpowered machine), the vending machine 100 will not dispense product to a user. In the case of non-powered vending machines 100, the non-powered vending machines 100 will receive power from the robot 200 after the robot 200 docks with the vending machine 100. To this end, the vending machine 100 and the robot 200 will be provided with complimentary electrical and mechanical couplings, e.g., 5 and 13 shown in FIG. 1.

In some instances, when the robot 200 docks with the vending machine 100, the robot 200 can query the vending machine 100 to determine or confirm where the product to be retrieved by the robot 200 is stored within the vending machine 100, e.g., in which coil or bin of the vending machine 100 the product is located. The robot 200 can then transmit a signal to cause the vending machine 100 to dispense the product from the indicated (or otherwise know) location, e.g., to turn one or more coils in which the desired product is stored. The signals transmitted to and from the vending machine can be transmitted via use of the power coupling between the robot 200 and the vending machine 100 and/or by a communicative connection otherwise established between the devices, e.g., a WiFi connection.

In some cases, the robot 200 can simply specify to the vending machine 100 the product (and possibly quantity of product as needed) that is to be retrieved by the robot 200. The vending machine 100, alone or cooperation with a cloud server 400, can then determine where the product to be retrieved by the robot 200 is stored within the vending machine 100, e.g., in which coil or bin of the vending machine 100 the product is located. The vending machine 100 can then cause itself to dispense the product from the determined location, e.g., to turn one or more coils in which the desired product is stored.

In connection with causing the vending machine 100 to dispense the product, the robot 200 can cause a secure holding bin on the robot to be opened (should one be provided). When using such a holding bin, the vending machine 100 may be provided with a complementary dispensing apparatus, such as a chute that is arranged to align with the bin when the vending machine 100 and robot 200 are docked. In this manner, the dispensed product will fall down the shoot provided to the vending machine 100 and directly into the holding bin in the robot 200. Upon receiving the product, the robot 200 will cause the bin door to close and lock and the robot will undock from the vending machine 100. This process can be repeated at other vending machines 100 to satisfy a user request, using the same or other holding bins to receive product from the vending machines 100. Similarly, different holding bins can be used to hold product for different users/different delivery locations retrieved from one or more vending machines 100.

In some instances, it will be appreciated that the robot 200 may further include a retrieving arm or the like to collect product from a distribution bin of the vending machine 100 into which product dispensed from the vending machine 100 is located. In this case, the robot 200 need not align itself with a distribution shoot provided to a vending machine 100 but will still need to position itself to allow arm access to the distribution bin.

Once the product has been retrieved, the robot 200 then uses the determined path or paths of travel to its delivery destination(s). As noted above, a delivery location can be a location specified for the user who requested the product, a location for a second user, and/or any other destination designated by the user. When the robot 200 arrives at the delivery location, the robot 200 may be required to receive input from the recipient to authorize unlocking of the bin(s). The unlocking can be facilitated by entry of a keypad code, facial recognition, fingerprint recognition, and/or the like without limitation. The bin door lock (if used) may also be unlocked simply upon the robot arriving at the desired location. Once product is removed by the user the bin doors are closed (manually or automatically) and the robot 200 may perform a further product retrieval operation or may be directed to a storage or recharging location.

It is to be appreciated that use of a robot 200 in this manner allows for vending machines 100 to be placed out of the way. Furthermore, use of non-powered vending machines 100 is advantageous in that they are less expensive to operate than powered vending machines, e.g., they do not draw power, require almost no electronics, require maintenance less often, etc. Furthermore, because the robot 200 can be provided with the intelligence in an example system, the vending machine 100 in such a system need not have an operating system to update. Still further, the vending machines 100 (powered and non-powered) in these example systems do not need to be connected to a network. Thus, non-powered vending machines 100 may have a quicker and cheaper installing process.

In some circumstances, the robot 200 may also be used to transmit transaction information to the vendor of the product in a vending machine 100. For example, the information may be used by the vendor to determine when to place a reorder transaction for restocking the vending machine 100. Valuable analytics can be performed on the data the robot collects. For example, a system operator can report back to the customer how many steps and how much time staff was previously taking to walk to and back from the previous generation of vending machines to demonstrate productivity improvements. This information can also help better locate the vending machines for the robot so that deliveries are even faster and energy efficient.

In instances where the system is voice enabled, the system may be further programmed to recognize the speaker. For example, when a user says "I need gloves," the system may determine what person is speaking and, based on the determined identify of the user, the specific gloves that person needs. The selection of which product to provide to a user in response to a generic request can be based on their personal product usage history. In a similar manner, the location of the user at the time of a request can also be used to determine the specific product the user is requesting when the product request is for a generic/category of product. That is, a person asking for gloves in a second location might receive different gloves than was received at a first location. Using prior history to retrieve the desired product has the advantage that the requesting person does not have to know the brand name or product number.

It will be appreciated that the robot product retrievals and deliveries can be scheduled for anywhere at any frequency, for any number of product, and at any time during the day, week, month, or, say, in response to an event, such like weather (raining/snowing today/temperature outside), that can be detected by monitoring the Internet or other sensors within an environment. It will also be appreciated that a user can also summon, using an app, a robot to come to a powerless vending machine, dock, and cause the vending machine to dispense the needed product. Preferably, a robot is stationed near a vending machine, so the overall delivery times are shorted and so that a walk-up user does not have to wait to retrieve product.

In a further example, the robot can also travel and dock with a mobile vending machine and bring the mobile vending machine to a user or location. In this example, it is contemplated that there can be a parking lot of various mobile vending machines that can be summoned as needed. In such an embodiment, it is also preferred that the vending machines be smaller in nature, e.g., the size of a dishwasher, to facilitate their being moved quickly and easily around a facility. The selection of the vending machine to bring to a user/location and the path to take may be determined as described above. Likewise, the manner of product retrieval from a vending machine may require user authorization as described above.

For selecting the appropriate vending machine from amongst a group of vending machines for delivery to a user, to the extent the vending machines are different, the vending machine is preferably provided with some means for differentiating itself to a robot. For example, the vending machine may emit a beacon signal with identifying information for reception by a robot, may be provided with a barcode, QR code or the like readable by the robot, may be provided with an NFC tag readable by the robot, or the like as needed for any particular purpose.

In the scenario where the robot can bring a vending machine to a desired location, the robot can also cause the vending machine to be brought to a restocking location. The decision as to when to bring a vending machine to the restocking location can be made based on the collected information as described above. Thus, in such a system, a robot, at the right time, may take a semi-depleted, mobile vending machine to a rendezvous point to meet a restocking agent. The restocking agent may fill the vending machine with new product or simply replace the vending machine with another fully stocked vending machine. In either case, the robot returns the stocked mobile vending machine back to its home or directly to a user as needed. In the case where the vending machine is simply replaced, the restocking agent will not have to open boxes at the customer location and place product into the mobile vending machines thus saving time. This extra time can be used to deliver many more mini vending machines in a given period of time or the saved time can be used to better build the relationship with the customer.

When the vending machine is allowed to be mobile, it will be appreciated that one or more robots can also follow a user around a location (e.g., airplane, automobile, lab, etc.) and bring the mobile vending machine(s) with it. Furthermore, using analytics, usage patterns can be monitored and the product in the mobile vending machines can be optimized and restocked (e.g., at a vendor location) differently than they were the last time.

It will be understood that the robot/vending machine systems described herein can also be used to manage complex multi-stage projects. For example, the system may discern or otherwise be instructed of which products to deploy when and where in the facility. Then, at a given time, such as at the start of the day, one or more stocked robots or robots with vending machines can position themselves near where employees enter a building in the morning. For use in discerning product to have staged for use, the robots will use information as described above. For example, the robots will know the environment they are working in and will therefore be able to discern the role of the labor force at a site by intelligently understanding the types of products they consume/use in their roles and where the products are generally used. The robot will be able to detect consumption (i.e. number of products pulled from robot, monitor usage for certain applications, etc.), and the like and based on this information the system will be able to aggregate and analyze the data to determined product usage patterns with certain applications/projects/usage, etc.

In certain circumstances, a robot will be programmed (alone or in combination with the cloud) to manage their own efficiency by modular effect in combining itself with other robots for economies of scale. For example, the system may cause a "daisy-chaining" of several robots together to expand capacity, etc. for offering a wider supply of product when the robot is docked to a vending machine that is intended to be moved with the robot. The linking of robots in such a manner may also be used to effectively manage efficient movement paths from one location to another, i.e., to leverage the notion of a "train" or the future traffic pattern of smart roads/autonomous electric vehicles, etc., to allow for efficient power consumption, i.e., to intelligently manage its power resources by "piggy backing" power sources, etc.

In still other circumstances, it will be appreciated that a robot can also be adapted to pull product from trailers, stage the product, then ultimately put-away the product on designated shelves.

In further embodiments, the described systems can be integrated with other supply chain and operations systems, such as warehouse management systems (WMS) and enterprise resource planning (ERP) systems, to allow for seamless communication between systems, ensuring that tasks are completed accurately and efficiently, product reordered as needed, etc.

In still further embodiments, a location to be visited subsequent to the delivery of product, such as a charging dock, could contain a scale or other measurement devices, such as optical scanners, to assure that the proper number of products were dispensed from the robot or the vending machine in the instances where the vending machine is moved with the robot. This could be a cross-check with onboard sensors that the robot and/or vending machine already has. If necessary, the system, e.g., the robot, could alert the customer that they will need to return any extra dispensed product.

Still further, it is contemplated with the system can employ sensors to detect when a replacement part is needed. For example, a light sensor can detect burnt out light bulbs, a temperature sensor can detect a need for a cooling device, etc. Data obtained by such sensors could be used to automatically trigger a dispatch of a robot 200 to the location being monitored by the sensor with the product ready to be dispensed as the replacement/to address the noted problem. Internet obtained data (alone or combined with sensor data) could also be used to dispense product to the appropriate area automatically, e.g., using weather station sensors plus local internet-based weather forecasts, dispatch robots could bring salt to all entrances of a building for someone to dispense.

In view of the foregoing, it will be appreciated that the described systems and methods have the advantage of being easily adapted to changing business needs, e.g., the described systems can be scaled up or down as required, can be adapted to handle multiple tasks, such as transporting goods, replenishing inventory, and performing cycle counts, without the need for any additional equipment or infrastructure, etc. In addition, the described systems and methods can operate safely in a confined space using advanced sensors and safety features that will cooperate to prevent collisions with objects and people. As need, the robots can also be programmed to avoid certain areas or hazardous materials and/or can be programmed to delivery materials/supplies to areas that would otherwise require the use of protective wear and equipment, thus saving costs associated with a need to replenish such equipment.

As will also be appreciated, the described systems and methods will improve efficiency in a confined space by reducing human error, increase productivity, and optimize the use of space. Utilizing a centralized command center, the robots can operate around the clock, without the need for breaks or rest, and can navigate around obstacles to complete tasks quickly. In addition, the robots can be used to collect data on various aspects of warehouse and distribution center operations, such as inventory levels, picking accuracy, and order fulfillment rates. This data can be analyzed to identify areas for improvement, optimize processes, and make data-driven decisions that improve overall efficiency and reduce costs. This data will be stored in a cloud-based system as a deep-lake dataset for use in refining system operations, e.g., to determine travel times, and/or to allow for the exploration of system performance and operation, e.g., to allow users to semantically and seamlessly explore and visually interact with datasets both a macroscopic and microscopic level, to slice, query filter combine, and examine data distributions in an interactive user interface, etc.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method for delivering a product from a vending machine to a destination location, comprising:

determining a path of travel for each of a plurality of robots to retrieve the product from the vending machine and to deliver the retrieved product to the destination location;

using at least the determined path of travel to determine at least one of an amount of battery charge and an amount of time required for each of the plurality of robots to retrieve the product from the vending machine and to deliver the retrieved product to the destination location, wherein determining at least one of an amount of battery charge includes determining an amount of battery charge required for a robot of the plurality of robots to provide electrical power to the vending machine to operate a product dispensing mechanism of the vending machine;

using the determined at least one of an amount of battery charge and an amount of time required for each of the plurality of robots to retrieve the product from the vending machine and to deliver the retrieved product to the destination location to select a one of the plurality of robots; and causing the selected one of the plurality of robots to use its determined path of travel to retrieve the product from the vending machine and to deliver the retrieved product to the destination location, wherein causing the selected robot to retrieve the product further comprises:

causing the selected robot to dock with the vending machine;

causing the selected robot to provide electrical power to the vending machine via a docking connection; and

wherein the provided electrical power enables the vending machine to operate the product dispensing mechanism to dispense the product to the selected robot.

2. The method as recited in claim 1, further comprising using the selected one of the plurality of robots to provide power to the vending machine to thereby allow the product to be retrieved from the vending machine, wherein the power comprises electrical power sufficient to operate electro-mechanical components of the product dispensing mechanism.

3. The method as recited in claim 2, further comprising:
determining a location for the product within the vending machine and using the selected one of the plurality of robots to instruct the vending machine to dispense the product from the determined location, wherein instructing the vending machine further comprises transmitting a control signal to the vending machine via the docking connection while simultaneously providing electrical power from the selected robot to enable the vending machine to actuate the product dispensing mechanism.

4. The method as recited in claim 3, wherein the location for the product within the vending machine comprises a one of a plurality of vending machine coils, and wherein the robot provides sufficient electrical power to operate a motor that rotates the vending machine coil to dispense the product.

5. The method as recited in claim 2, further comprising:
receiving by the vending machine from the robot an indication of the product to be dispensed;
determining by the vending machine a location for the product within the vending machine; and
automatically dispensing by the vending machine the product from the determined location using electrical power provided by the robot via the docking connection.

6. The method as recited in claim 1, further comprising receiving a request to deliver the product from the vending machine prior to determining the path of travel for each of a plurality of robots to retrieve the product from the vending machine and to deliver the retrieved product to the destination location.

7. The method as recited in claim 6, further comprising using an identifier for the product included in the request to determine a one of a plurality of vending machines from which the product is to be retrieved.

8. The method as recited in claim 6, further comprising using an identifier for a device from which the request is received to determine the destination location.

9. The method as recited in claim 6, further comprising using a device generated geo-locator provided with the request to determine the destination location.

10. The method as recited in claim 1, further comprising storing by the robot the product retrieved from the vending machine in a secure storage area of the robot, wherein the secure storage area is thermally insulated, and wherein storing the product further comprises the robot receiving the product from a dispensing area in the vending machine after the vending machine dispenses the product using electrical power provided by the robot.

11. The method as recited in claim 1, further comprising using at least an amount of battery charge required to power on the vending machine and to operate the product dispensing mechanism of the vending machine to retrieve the product from the vending machine and to deliver the retrieved product to the destination location to determine the amount of battery charge required for each of the plurality of robots to retrieve the product from the vending machine and to deliver the retrieved product to the destination location.

12. The method as recited in claim 1, further comprising causing the vending machine to inform a supply chain management system of current product inventory.

13. The method as recited in claim 1, further comprising weighing the robot subsequent to the robot leaving the destination location to ensure removal of the product from the robot, wherein weighing the robot comprises using a scale integrated into the robot to measure a total weight of the robot and comparing the measured total weight to an expected weight after product delivery.

14. A method for delivering a product from a vending machine to a destination location, comprising:
determining a path of travel for a robot to retrieve the product from the vending machine and to deliver the retrieved product to the destination location; and
causing the robot to use the determined path of travel to retrieve the product from the vending machine and to deliver the retrieved product to the destination location;
wherein causing the robot to retrieve the product from the vending machine comprises causing the robot to provide power to the vending machine to thereby allow the vending machine to operate a product dispensing mechanism;
wherein causing the robot to provide power comprises causing the robot to establish a docking connection with the vending machine to transfer electrical power from the robot to the vending machine; and
wherein the product dispensing mechanism is unpowered until the robot provides electrical power via the docking connection.

15. The method as recited in claim 14, further comprising using a docking connection between the robot and the vending machine to provide power to the vending machine.

16. The method as recited in claim 14, further comprising determining the product dispensing mechanism associated with the product within the vending machine and using the robot to instruct the vending machine to actuate the product dispensing mechanism.

17. The method as recited in claim 16, wherein the product dispensing mechanism comprises a vending machine coil.

18. The method as recited in claim 14, further comprising receiving by the vending machine from the robot an indication of the product to be dispensed, determining by the vending machine the product dispensing mechanism associated with the product within the vending machine, and automatically actuating the product dispensing mechanism.

19. The method as recited in claim 14, further comprising receiving a request to deliver the product from the vending machine prior to determining the path of travel.

20. The method as recited in claim 19, comprising using an identifier for the product included in the request to determine a one of a plurality of vending machines from which the product is to retrieved.

21. The method as recited in claim 19, comprising using an identifier for a device from which the request is received to determine the destination location.

22. The method as recited in claim 19, comprising using a device generated, geo-locater provided with the request to determine the destination location.

23. The method as recited in claim 14, comprising storing by the robot the product retrieved from the vending machine in a secure storage area of the robot.

* * * * *